United States Patent
Kawano et al.

(10) Patent No.: US 7,142,336 B2
(45) Date of Patent: Nov. 28, 2006

(54) RECORDING MEDIUM AND HOLOGRAM READER

(75) Inventors: Katsunori Kawano, Kanagawa (JP); Norie Matsui, Kanagawa (JP); Makoto Furuki, Kanagawa (JP); Akira Tateishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/049,434

(22) Filed: Feb. 3, 2005

(65) Prior Publication Data

US 2006/0023279 A1    Feb. 2, 2006

(30) Foreign Application Priority Data

Aug. 2, 2004    (JP)    ............................. 2004-226062

(51) Int. Cl.
*G03H 1/00*    (2006.01)
(52) U.S. Cl. ...................... 359/2; 359/5; 359/10; 359/1
(58) Field of Classification Search .................... 359/2, 359/3, 5, 10, 1
See application file for complete search history.

(56) References Cited

U.S. PATENT DOCUMENTS 5,920,058 A * 7/1999 Weber et al. ................ 235/457

FOREIGN PATENT DOCUMENTS

JP    A 2000-348149    12/2000

OTHER PUBLICATIONS

Yatagai, "Light and Fourier Transform," published by Asakura Shoten, chapter 7, May 1992.

* cited by examiner

*Primary Examiner*—Fayez G. Assaf
(74) *Attorney, Agent, or Firm*—Oliff & Berridge, PLC

(57) ABSTRACT

A recording medium including a storage part to hold a medium identifier intrinsic to each recording medium, and a hologram generated using a reference beam modulated with the medium identifier. Preferably, the hologram is fixed on a surface of the recording medium.

10 Claims, 2 Drawing Sheets

| MEDIUM IDENTIFIER | DATE AND TIME | NOISE LEVEL |
|---|---|---|
| aaaa | bbbb | cccc |
| ⋮ | ⋮ | ⋮ |

RECORDING MEDIUM AND HOLOGRAM READER

BACKGROUND OF THE INVENTION

1. Field of the Invention

The present invention relates to a recording medium fixing a hologram, and a hologram reader to read the hologram from the recording medium.

2. Description of the Related Art

In recent years, a recording medium of the card type having a magnetic storage and/or an IC chip has widespread. For example, there is a credit card storing the information for authorization of the principal. Also, there is a personal ID card in which a face photograph is bonded on the recording medium, with the name described. This personal ID card is employed as a membership card or a pass.

In this way, since such recording medium is often employed for the purposes of personal authorization, it is necessary to take a security measure to prevent the information stored in the magnetic storage area from being illegally rewritten or forged.

In this recording medium, the magnetic storage area is basically a rewritable memory, which can not fully prevent forgery. Thus, with a technique as disclosed in JP-A-2000-348149, a hologram having the characteristic that the new information can be added, but the information written in the past can not be altered is employed.

However, the conventional technique as disclosed in JP-A-2000-348149 had the following problems. That is, in these days, the fingerprint or iris information (so-called biometrics information) intrinsic to the personal is often employed to make personal authorization more adequate. When the technique as disclosed in JP-A-2000-348149 is employed, it is required to store the biometrics information for personal authorization in a database, whereby there is a great management load not to illegally leak the biometrics information from the database.

Also, in the registration of database, the biometrics information is recorded as the digital information, and easily copied in full form owing to the characteristics of the digital information, which is one cause of increasing the management load of the database.

Moreover, the technique as disclosed in JP-A-2000-348149 can not deal with a case where the hologram itself is forged.

SUMMARY OF THE INVENTION

According to an aspect of the present invention, a recording medium includes a storage part to hold a medium identifier intrinsic to each recording medium, and a hologram generated using a reference beam modulated with the medium identifier. Preferably, the hologram is fixed on a surface of the recording medium.

According to another aspect of the present invention, a hologram reader includes a reading unit to read a medium identifier from a recording medium which includes a storage part to hold a medium identifier intrinsic to each of the recording medium, and a hologram generated using a reference beam modulated with the medium identifier and fixed on a surface of the recording medium, and a generating unit to generate a regenerative beam from the hologram by applying the reference beam to the hologram.

According to yet another aspect of the present invention, a hologram reading method includes reading a medium identifier from a recording medium which includes a storage part to hold a medium identifier intrinsic to each of the recording medium, and a hologram generated using a reference beam modulated with the medium identifier and fixed on a surface of the recording medium, and generating a regenerative beam from the hologram by applying the reference beam to the hologram.

According to still another aspect of the present invention, a hologram reading program for realizing a processing to a computer, the hologram reading method includes reading a medium identifier from a recording medium which includes a storage part to hold a medium identifier intrinsic to each of the recording medium, and a hologram generated using a reference beam modulated with the medium identifier and fixed on a surface of the recording medium, and generating a regenerative beam from the hologram by applying the reference beam to the hologram.

BRIEF DESCRIPTION OF THE DRAWINGS

Preferred embodiments of the present invention will be described in detail based on the following figures, wherein.

DETAILED DESCRIPTION OF THE INVENTION

Figure 1:
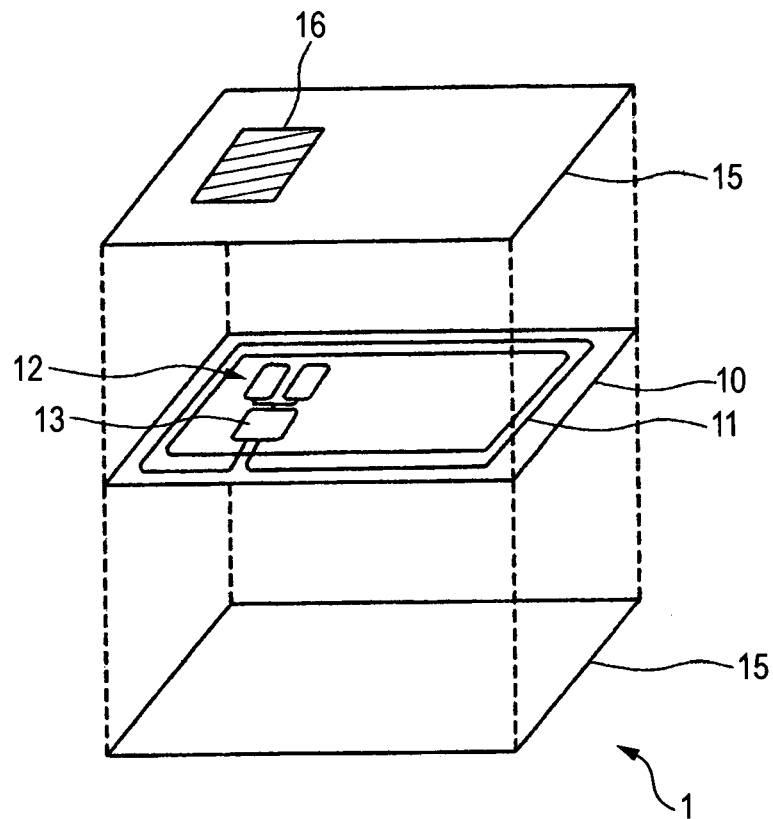
FIG. 1 is an explanatory view showing an example of a recording medium according to an embodiment of the present invention.

The preferred embodiments of the present invention will be described below with reference to the accompanying drawings. A recording medium 1 according to an embodiment of the invention includes a substrate 10, and two protectors 15 bonded on both sides of the substrate 10, as shown in FIG. 1. The substrate 10 is formed with an antenna 11, a storage element 12, and a control part 13. The storage element 12 stores a medium identifier intrinsic to each recording medium 1. When a signal requesting the medium identifier is received by the antenna 11, the control part 13 reads the medium identifier from the storage element 12, and transmits a signal representing the medium identifier via the antenna 11.

Also, at least one hologram is recorded on a surface of at least one of the protectors 15 for this recording medium 1. Therefore, a hologram fixing layer 16 is formed in a part of the protector 15. Specifically, the hologram fixing layer 16 is formed by bonding a member containing a once writable photo-polymer material, or a rewritable azo-polymer material.

The hologram is recorded by applying an object beam and a reference beam onto this member. In this embodiment, a spatial light modulator is employed to generate an object beam. That is, the personal information of a holder of the recording medium 1, for example, the biometrics information such as an image of face photograph, an image of fingerprint, and an image of iris is inputted into this spatial light modulator. Specifically, the spatial light modulator includes a liquid crystal display that transmits light, in which an image of biometrics information is displayed on the liquid crystal display. When a light radiated from a light source is transmitted through the liquid crystal display, it is spatially modulated in the intensity or phase by the image of biometrics information. This modulated light, which is employed as the object beam, is converged (Fourier transform) by a lens to be incident on the hologram fixing layer 16.

The object beam is entered, and further the reference beam is entered. This reference beam is modulated using the medium identifier of the recording medium 1. Specifically, the spatial light modulator is employed. In this case, the image displayed on the liquid crystal display may be a sign image (e.g., two-dimensional bar code image) produced based on the medium identifier.

By applying the object beam and the reference beam to the hologram fixing layer 16 simultaneously, a hologram due to interference between the object beam modulated with the image of biometrics information and the reference beam modulated with the image of medium identifier is fixed and recorded on the hologram fixing layer 16.

Figure 2:
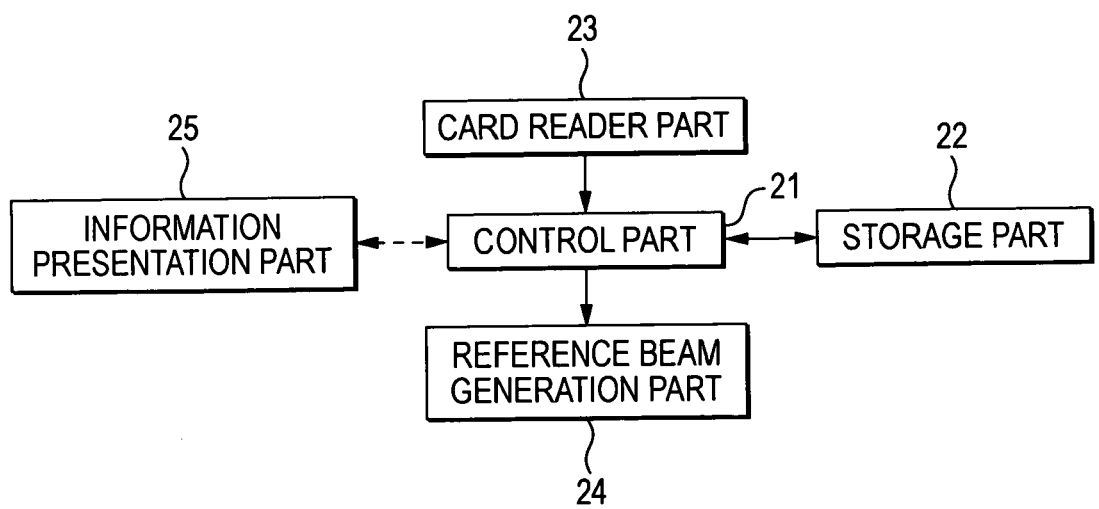
FIG. 2 is a block diagram of a hologram reader according to another embodiment of the invention.

Also, a hologram reader according to another embodiment of the invention includes a control part 21, a storage part 22, a card reader part 23, a reference beam generation part 24, and an information presentation part 25, as shown in FIG. 2.

The control part 21 may be a CPU, which operates in accordance with a program stored in the storage part 22. This control part 21 performs a process (hologram reproduction process) to output the medium identifier read from the recording medium 1 by the card reader part 23 to the reference beam generation part 24. The specific contents of this process for the control part 21 will be described later in detail.

The storage part 22 includes the memory elements such as a RAM (Random Access Memory) and a ROM (Read Only Memory), and any other computer readable recording medium such as a disk device. This storage part 22 stores a program that is executed by the control part 21. Also, the storage part 22 operates as a work memory holding various kinds of data that are required in the process of the control part 21.

The card reader part 23 includes an antenna, in which if it is detected that the recording medium 1 is proximate, a signal requesting the medium identifier is sent to the recording medium 1. And if the medium identifier is received from the recording medium 1, the received medium identifier is outputted to the control part 21.

The reference beam generation part 24 includes a spatial light modulator, which modulates a light from the light source with the image of medium identifier that is inputted from the control part 21 and projects the light. The information presentation part 25 presents a reproduced video of the object beam (regenerative beam) projected from the hologram, when the hologram is irradiated with the light projected by the reference beam generation part 24. Specifically, this information presentation part 25 is not necessarily connected to the control part 21, and may be a screen made of ground glass, for example. Also, it may include an image pick-up element such as CMOS or CCD and a display, in which the object beam (regenerative beam) projected from the hologram is received and picked up by the image pick-up element and the picked up video data is displayed on the display.

The recording medium 1 according to the embodiment and an application example of the hologram reader as an authorization device to make personal authorization using this recording medium 1 and its operation will be described below.

The recording medium 1 is issued in advance as a student's identification card, a company's member card, or a membership card, for example. At the time of issuance, a photograph of a bearer's face is taken, the object beam is modulated with the image of this face photograph and projected, and the reference beam is modulated with a two-dimensional bar code image of the medium identifier intrinsic to each recording medium 1 and projected to create a hologram. This hologram is fixed on the recording medium 1.

Also, the hologram reader is installed at a place where it is necessary to present the student's identification card, company's member card, or membership card (e.g., library of the university, institution entrance for the members).

The bearer carries the recording medium 1, and makes the recording medium 1 proximate to the card reader part 23 of the hologram reader installed at the place where it is necessary to present the recording medium 1. Then, the card reader part 23 senses that the recording medium 1 is proximate, and sends a signal requesting the medium identifier to the recording medium 1. The recording medium 1 sends the stored medium identifier. The card reader part 23 receives the medium identifier from the recording medium 1 and outputs it to the control part 21.

The control part 21 produces the two-dimensional bar code image based on the medium identifier, and outputs it to the reference beam generation part 24. The reference beam generation part 24 projects the reference beam modulated with the two-dimensional bar code image. If the user holds the hologram fixed on the recording medium 1 in the reference beam, an object beam (regenerative beam) is radiated from the hologram, so that a video based on the regenerative beam is reflected on the information presentation part 25.

The guard or staff for verifying the presented membership card compares this video with the face of bearer, and determines whether or not the bearer of the recording medium 1 is authorized, and whether the presented recording medium 1 is valid. In this embodiment, the personal authorization is enabled by the information recorded in the recording medium 1 without the use of the database recording the personal information, whereby the management load of the database is relieved.

Figures 3, 4:
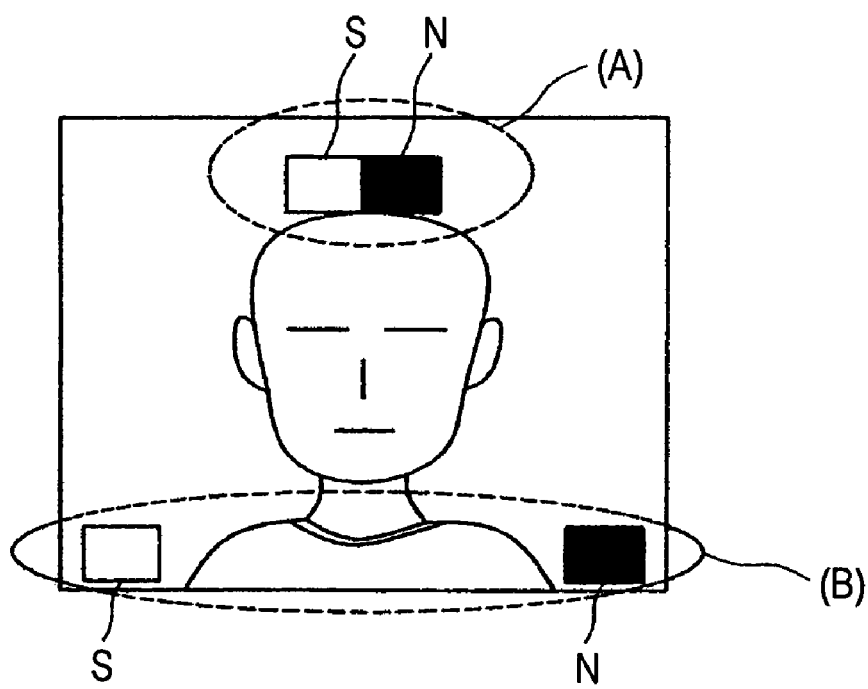
FIG. 3 is an explanatory view showing an example of a hologram fixed on the recording medium according to the embodiment of the invention.
FIG. 4 is an explanatory view showing an example of a database that records the noise level.

Also, the hologram of the recording medium 1 in this embodiment may contain a marker portion to measure the noise level in a predetermined partial area. This marker portion includes a light portion S and a dark portion N, as shown in FIG. 3. The light portion S and the dark portion N may be arranged adjacent to each other (A), or separately (B). In FIG. 3, for simplicity of explanation, a state of the object beam recorded in the hologram is illustrated. In reality, the light portion S is the hologram image of almost white color, and the dark portion N is the hologram image of almost black color. Also, a plurality of areas of the light portion S and the dark portion N may be provided.

To make use of this marker portion, the information presentation part 25 of the hologram reader picks up the object beam (regenerative beam) radiated from the hologram, using an image pickup device, when the reference beam is projected, and outputs the image to the control part 21. And the control part 21 detects the light intensities of the light portion S and the dark portion N in a predetermined area where they are recorded (average lightness value of pixels contained in the predetermined area), and outputs its ratio as the information of noise level (measured result).

That is, the recording medium 1 is hurt or contaminated on the surface as the time for carrying it passes, so that the light intensity of the light portion S is asymptotic to that of the dark portion N. Specifically, the light intensity may be information of lightness, and digitized in "256" for white and "1" for black. And the control part 21 calculates the ratio of the lightness of light portion S to that of dark portion N. As this ratio is closer to "1", it is determined that the recording medium 1 is more contaminated (deteriorated).

The control part 21 determines that the marker portion is unreadable, and indicates a message on the display of the information presentation part 25, when this ratio is below a predetermined threshold value (e.g., "2").

Moreover, the control part 21 may store a database recording a history of noise level in the storage part 22. This database stores relationally the medium identifier, the date and time of reading the medium identifier, and the calculated noise level, as shown in FIG. 4.

The control part 21 stores relationally the information of date and time (acquired from a calendar or clock, not shown) when the information of noise level is calculated, and the medium identifier of the recording medium 1 fixing the hologram according to the noise level, in this database.

And the control part 21 acquires the information of noise level recorded in the past (e.g., previous time) associated with the medium identifier from this database. And the noise level calculated and recorded at this time and the noise level recorded in the past (history of noise level) are compared, and if the information of noise level recorded at this time has a smaller value than recorded in the past, it is determined that the recording medium has deteriorated.

Also, the information of noise level calculated and recorded at this time has a larger value than recorded in the past, it follows that the recording medium has retrograded. Thus, the control part 21 outputs a message that the hologram is doubtfully forged (newly fabricated and bonded on the recording medium 1) on the display of the information presentation part 25, when it is determined that the extent of deterioration has retrogressed as it is common that the recording medium deteriorates while being carried.

Though the noise level recorded at this time and the noise level recorded in the past are compared in this example, a difference between them may be employed for processing. Eventually, when it is determined that the deterioration has progressed, and if a difference between the noise level recorded at this time and the noise level recorded in the past is beyond a predetermined threshold value, a message indicating that the hologram is doubtfully forged is indicated on the display of the information presentation part 25. This is aimed to prevent illegal use of pretending that the extent of deterioration is great because the forged hologram is purposely contaminated.

Herein, the threshold value may be predetermined, or decided in accordance with an increasing function of date and time difference, which is a difference between the recording date and time in the past and the recording date and time at present. Because it is assumed that if a long time has elapsed, the extent of deterioration is greater.

Moreover, the control part 21 plots the information of each noise level, which is acquired from the database, except for the information recorded at this time, as a graph with the elapse of time, and makes a predetermined curve fitting (e.g., well known polynomial interpolation) for the plot. Then, the control part determines whether or not the noise level recorded at this time is within a predetermined range from a value predicted (by extrapolation) from the curve fitting, and if the value is out of the predetermined range, a message that there is a doubt that the hologram is forged may appear on the display of the information presentation part 25.

Through this processing, when the malicious third party bonds a hologram image produced based on the face photograph of the third party on an illegally acquired recording medium and brings it, the guard or staff is notified that there is a doubt that the hologram is forged, unless the extent of deterioration of the hologram image is consistent over the entire area. Thereby, it is possible to prevent the illegal entrance of the malicious third party.

Though the database is stored in the storage part 22, it may be held in a database server connected via the network. In this case, the database only holds the medium identifier and the information of noise level, but contains no information corresponding to the personal information, whereby the management load of the database is relatively light.

Though in the above explanation, the object beam (regenerative beam) radiated from the hologram is presented to the screen or display to be usable by the guard or staff, the hologram reader of this embodiment may further include a camera to pick up the face photograph of the bearer of the recording medium 1. In this case, the control part 21 acquires the data of the face photograph of the bearer of the recording medium 1, which is picked up by the camera, whereby the face photograph data and the image data radiated from the hologram and digitized by the image pick-up element are compared. This comparison is made based on a predetermined feature amount by specifying the eye positions and measuring the interval between left eye and right eye from each image data of comparison object. This comparison method is widely employed in the processing techniques of face photograph data.

Also, the object beam (regenerative beam) radiated from the hologram may be optically correlated with the face image of the bearer for calculation. This calculation method is effected by a well known method using a Joint Transform Correlator or a Matched Filter (e.g., refer to Toyohiko Yatagai "Light and Fourier Transform", published by Asakura Shoten, chapter 7).

The control part 21 may present the results of comparison processing or optical correlation operation on the display, or control the gate to be opened or closed, based on those results.

The hologram may be generated, including a marker portion to measure a noise level in a part thereof.

A hologram reader according to another embodiment of the invention is characterized by including a unit to read the medium identifier, when the hologram is generated, including the marker portion to measure the noise level in a part thereof, a unit to generate a regenerative beam from the hologram by applying a reference beam modulated with the medium identifier to the hologram fixed on a surface of the recording medium, and a unit to measure a noise level by referring to the marker portion contained in the regenerative beam and outputting the measured result.

Herein, the hologram reader may include a unit, connected to be accessible to a database, to record relationally the medium identifier and the measured result of the noise level in the database, wherein a history of the measured result of the noise level recorded in the database is subjected to a predetermined processing.

The entire disclosure of Japanese Patent Application No. 2004-226062 filed on Aug. 2, 2004 including specification, claims, drawings and abstract is incorporated herein by reference in its entirety.

What is claimed is:

1. A recording medium comprising:
   a storage part to hold a medium identifier intrinsic to each recording medium; and
   a hologram generated using a reference beam modulated with the medium identifier,
   wherein the hologram and the storage part are fixed on a surface of the recording medium.

2. The recording medium according to claim 1, wherein the hologram includes a marker portion to measure a noise level in a part thereof.

3. A hologram reader comprising:
   a reading unit to read a medium identifier from a storage part fixed on a surface of a recording medium, the medium identifier intrinsic to each of the recording medium; and
   a generating unit to generate a regenerative beam from a hologram, the hologram recorded using a first reference beam modulated with the medium identifier and fixed on a surface of the recording medium, by applying a second reference beam modulated with the medium identifier to the hologram.

4. The hologram reader according to claim 3, wherein the hologram includes a marker portion to measure a noise level in a part thereof.

5. The hologram reader according to claim 4, further comprising:
   a measuring unit to measure a noise level contained in the regenerative beam by referring to the marker portion and to output a measured result.

6. The hologram reader according to claim 5, further comprising:
   a connecting unit to connect the hologram reader to a database to be accessible; and
   a recording unit to record relationally the medium identifier and the measured result of the noise level in the database,
   wherein a history of the measured result of the noise level recorded in the database is subjected to a predetermined processing.

7. A hologram reading method comprising:
   reading a medium identifier from a storage part fixed on a surface of a recording medium, the medium identifier intrinsic to each of the recording medium; and
   generating a regenerative beam from a hologram, the hologram recorded using a first reference beam modulated with the medium identifier and fixed on a surface of the recording medium, by applying a second reference beam modulated with the medium identifier to the hologram.

8. The hologram reading method according to claim 7, wherein the hologram includes a marker portion to measure a noise level in a part thereof.

9. A storage medium readable by a computer, the storage medium storing a program of instructions executable by the computer to perform a function for reading a hologram, the function comprising the steps of:
   reading a medium identifier from a storage part fixed on a surface of a recording medium, the medium identifier intrinsic to each of the recording medium; and
   generating a regenerative beam from a hologram, the hologram recorded using a first reference beam modulated with the medium identifier and fixed on a surface of the recording medium, by applying a second reference beam modulated with the medium identifier to the hologram.

10. The storage medium according to claim 9, wherein the hologram includes a marker portion to measure a noise level in a part thereof.

* * * * *